(12) United States Patent
Huang et al.

(10) Patent No.: US 12,262,226 B2
(45) Date of Patent: Mar. 25, 2025

(54) CROSS LINK MANAGEMENT FRAME SIGNALING

(71) Applicant: Intel Corporation, Santa Clara, CA (US)

(72) Inventors: Po-Kai Huang, San Jose, CA (US); Daniel F. Bravo, Hillsboro, OR (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 17/509,938

(22) Filed: Oct. 25, 2021

(65) Prior Publication Data

US 2022/0116797 A1 Apr. 14, 2022

Related U.S. Application Data

(60) Provisional application No. 63/106,767, filed on Oct. 28, 2020.

(51) Int. Cl.
*H04W 24/02* (2009.01)
*H04B 7/0413* (2017.01)
*H04L 69/22* (2022.01)
*H04W 84/12* (2009.01)

(52) U.S. Cl.
CPC .......... *H04W 24/02* (2013.01); *H04B 7/0413* (2013.01); *H04L 69/22* (2013.01); *H04W 84/12* (2013.01)

(58) Field of Classification Search
CPC ..... H04W 52/02; H04W 60/04; H04W 76/20; H04W 88/08; H04W 74/0816; H04L 1/10013; H04L 1/1607
See application file for complete search history.

(56) References Cited

U.S. PATENT DOCUMENTS

| | | | |
|---|---|---|---|
| 2021/0266891 A1* | 8/2021 | Chu | H04L 5/1469 |
| 2021/0298102 A1* | 9/2021 | Kwon | H04W 48/08 |
| 2021/0321410 A1* | 10/2021 | Patil | H04W 72/27 |

* cited by examiner

*Primary Examiner* — Iqbal Zaidi
(74) *Attorney, Agent, or Firm* — Schwegman Lundberg & Woessner, P.A.

(57) ABSTRACT

Methods, apparatuses, and computer readable media for communicating elements between multi-link devices are disclosed. Apparatuses of a multi-link device (MLD) are disclosed, where the apparatuses comprise processing circuitry configured to encode a management frame, the management frame comprising a link information field, the link information field indicating a first link of the MLD for which management information is applicable and configure a non-access point (AP) of the MLD or a station (STA) of the MUD to transmit the management frame on a second link of the MLD. The processing circuitry is further configured to decode a second management frame, the second management frame comprising a second link information field, the second link information field indicating a second link of the MLD for which second management information is applicable.

16 Claims, 20 Drawing Sheets

| 1702 | 1704 | 1706 | 1708 | 1710 | 1712 | 1714 | 1716 | 1718 | 1720 | 1722 | 1724 |
|---|---|---|---|---|---|---|---|---|---|---|---|
| MAC HEADER | OTHER FIELDS | ELEMENT ID | LEN-GTH | ELEMENT ID EXTENSION | ELEMENT CONTENT | LINK INFO | ELEMENT ID | LEN-GTH | ELEMENT ID EXTENSION | ELEMENT CONTENT | LINK INFO |

FIG. 17

CROSS LINK MANAGEMENT FRAME SIGNALING

PRIORITY CLAIM

This application claims the benefit of priority under 35 USC 119(e) to U.S. Provisional Patent Application Ser. No. 63/106,767 filed Oct. 28, 2020, which is incorporated herein by reference in their entirety.

TECHNICAL FIELD

Embodiments relate to multi-link devices (MLDs) operating in accordance with wireless local area networks (WLANs) and Wi-Fi networks including networks operating in accordance with different versions or generations of the IEEE 802.11 family of standards. Some embodiments relate to the transmission of management frames to stations (STAB) and access points (APs) of MLDs.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 17 illustrates an example link information, in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
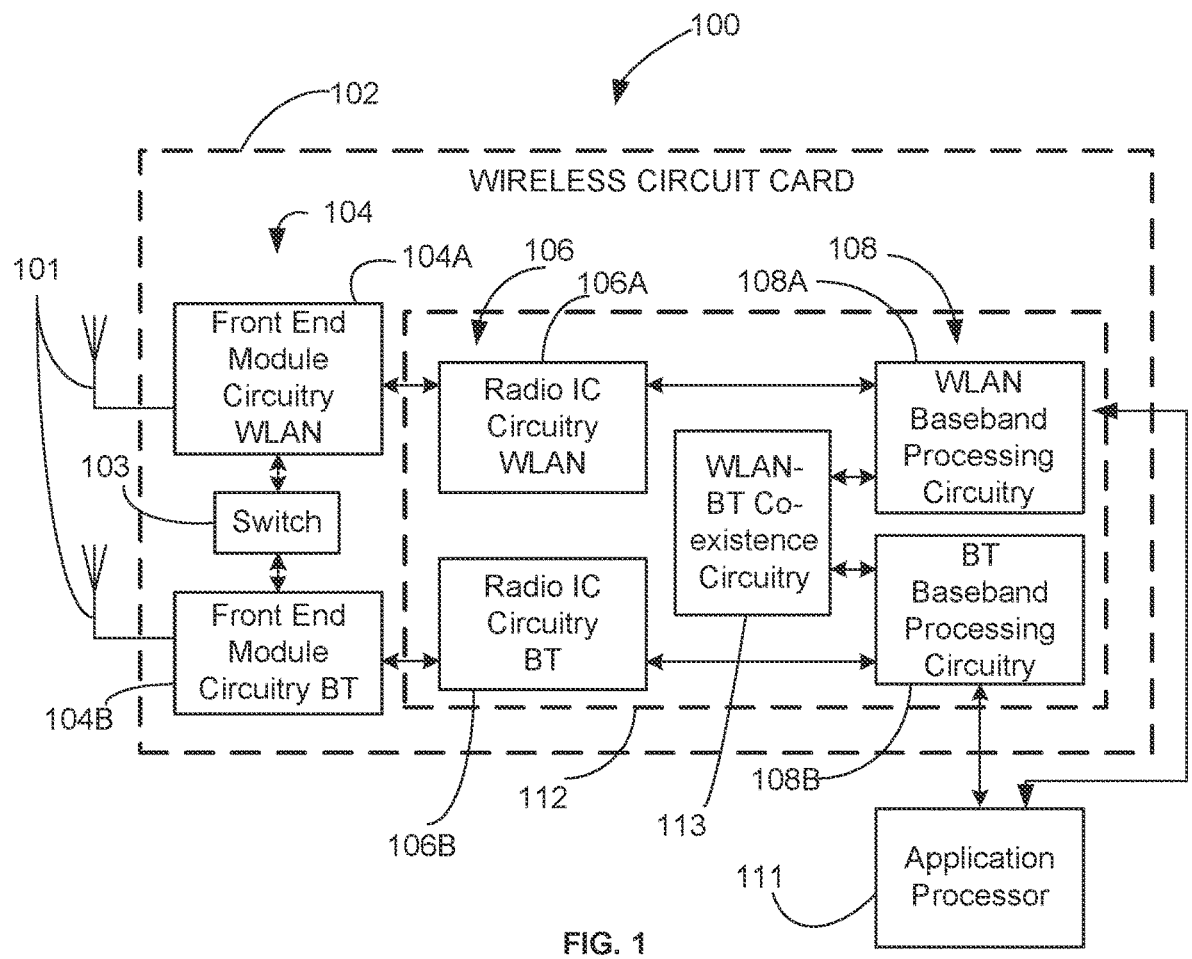
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RE signals received from one or more antennas 101, to amplify the received signals and to provide the amplified versions of the received signals to the BT radio IC circuitry 106B for further processing. FENT circuitry 104A may also include a transmit signal path which may include circuitry configured to amplify WLAN signals provided by the radio IC circuitry 106A for wireless transmission by one or more of the antennas 101, In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the ITEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WEAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 1083. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A, Each of the WLAN baseband circuitry 108A and the BT baseband circuitry 108B may further include one or more processors and control logic to process the signals received from the corresponding WLAN or BIT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WEAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multi carrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, WEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LIE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
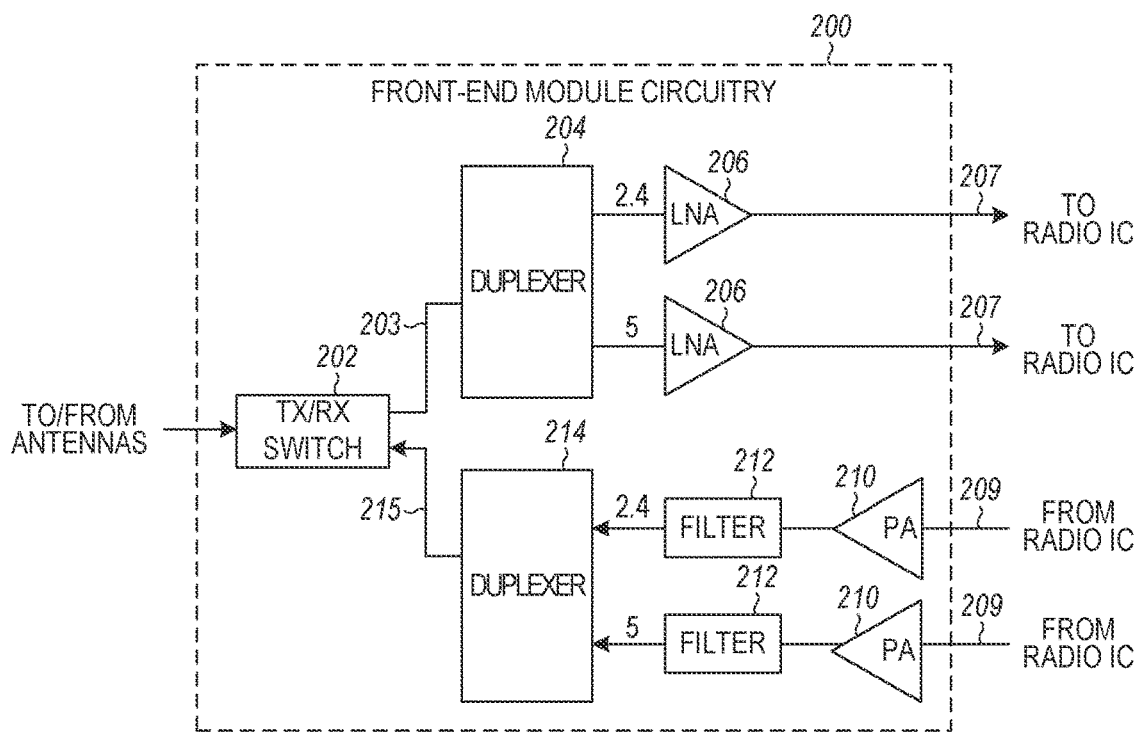
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RE signals 203 and provide the amplified received RE signals 207 as an output (e.g., to the radio IC circuitry 106 (FIG. 1)). The transmit signal path of the circuitry 20) may include a power amplifier (PA) to amplify input RE signals 209 (e.g., provided by the radio IC circuitry 106), and one or more filters 212, such as band-pass filters (BPEs), low-pass filters (LPEs) or other types of filters, to generate RE signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
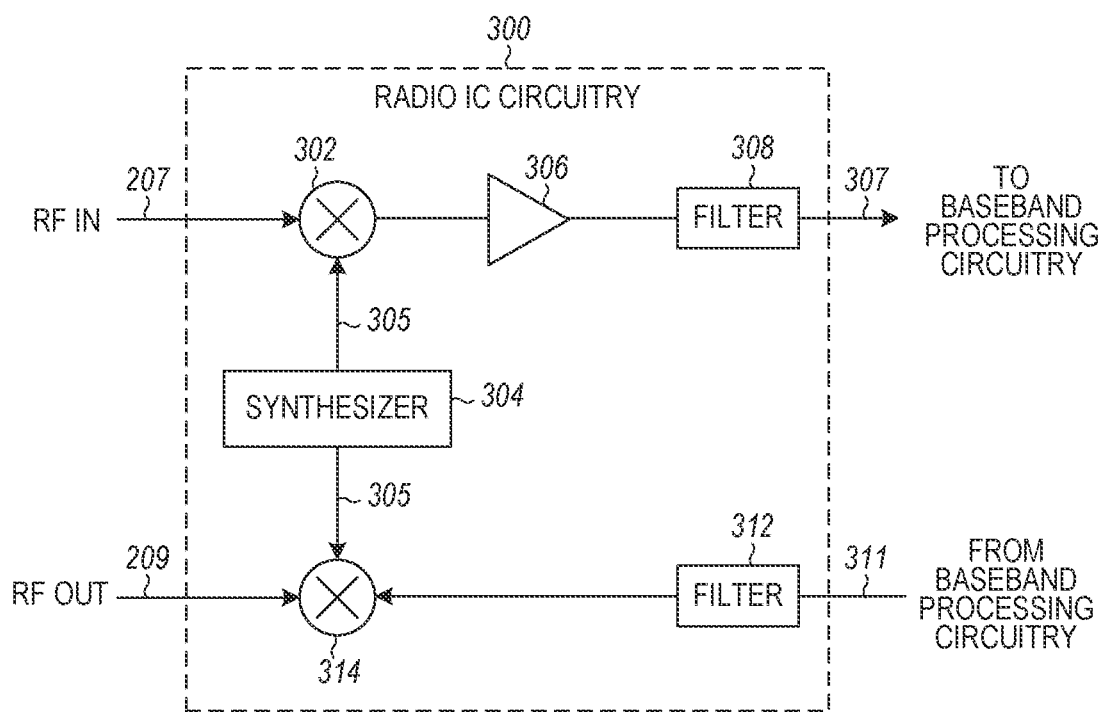
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation, FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
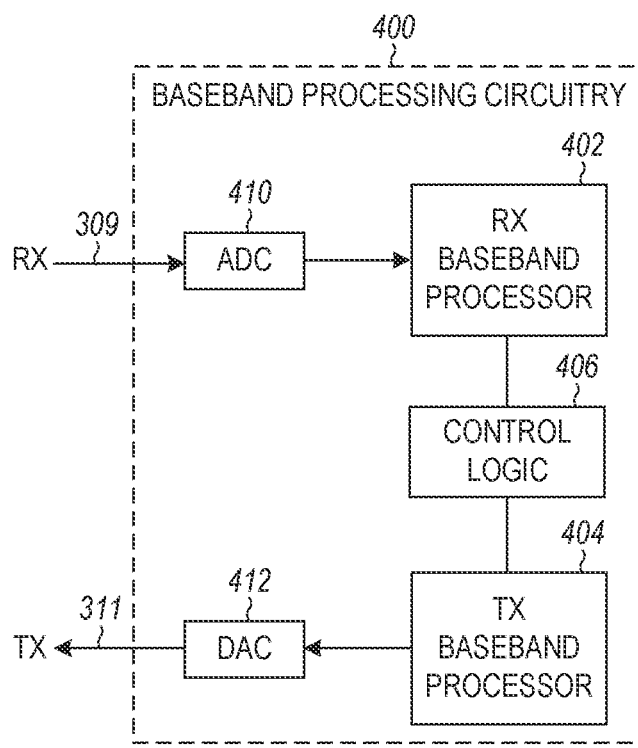
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (FA BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MEM) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
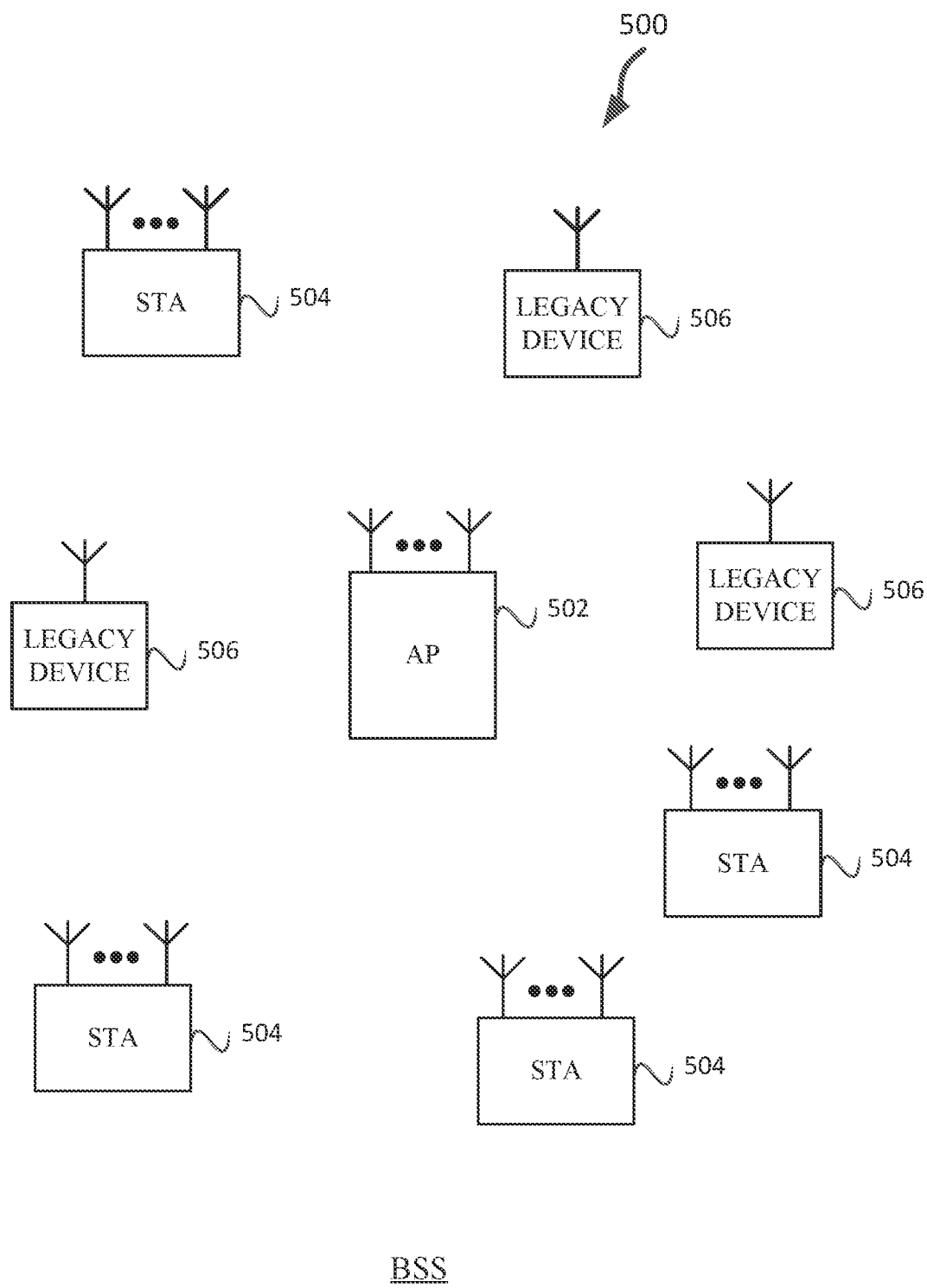
FIG. 5 illustrates a WLAN in accordance with some embodiments.

FIG. 5 illustrates a WEAN 500 in accordance with some embodiments. The WEAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11. The STA 504 and AP 502 (or apparatuses of) may be configured to operate in accordance with IEEE P802.11.be™/D1.2, September 2021, IEEE P802.11ax™/D8.0, October 2020, and/or IEEE Std 802.11™-2020, which are incorporated herein by reference in their entirety.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The WEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the Internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11 be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (15-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.111EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 502 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-24.

In example embodiments, the STAs 504 and/or the HE AP 502 are configured to perform the methods and operations/functions described herein in conjunction with FIGS. 1-24. In example embodiments, an apparatus of the STA 504 and/or an apparatus of the AP 502 are configured to perform the methods and functions described herein in conjunction with FIGS. 1-24. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to a AP 502 and/or STAs 504 that are operating as EHT APs 502. In some embodiments, when a STA 504 is not operating as an AP, it may be referred to as a non-AP STA or non-AP. In some embodiments. STA 504 may be referred to as either an AP STA or a non-AP.

Figure 6:
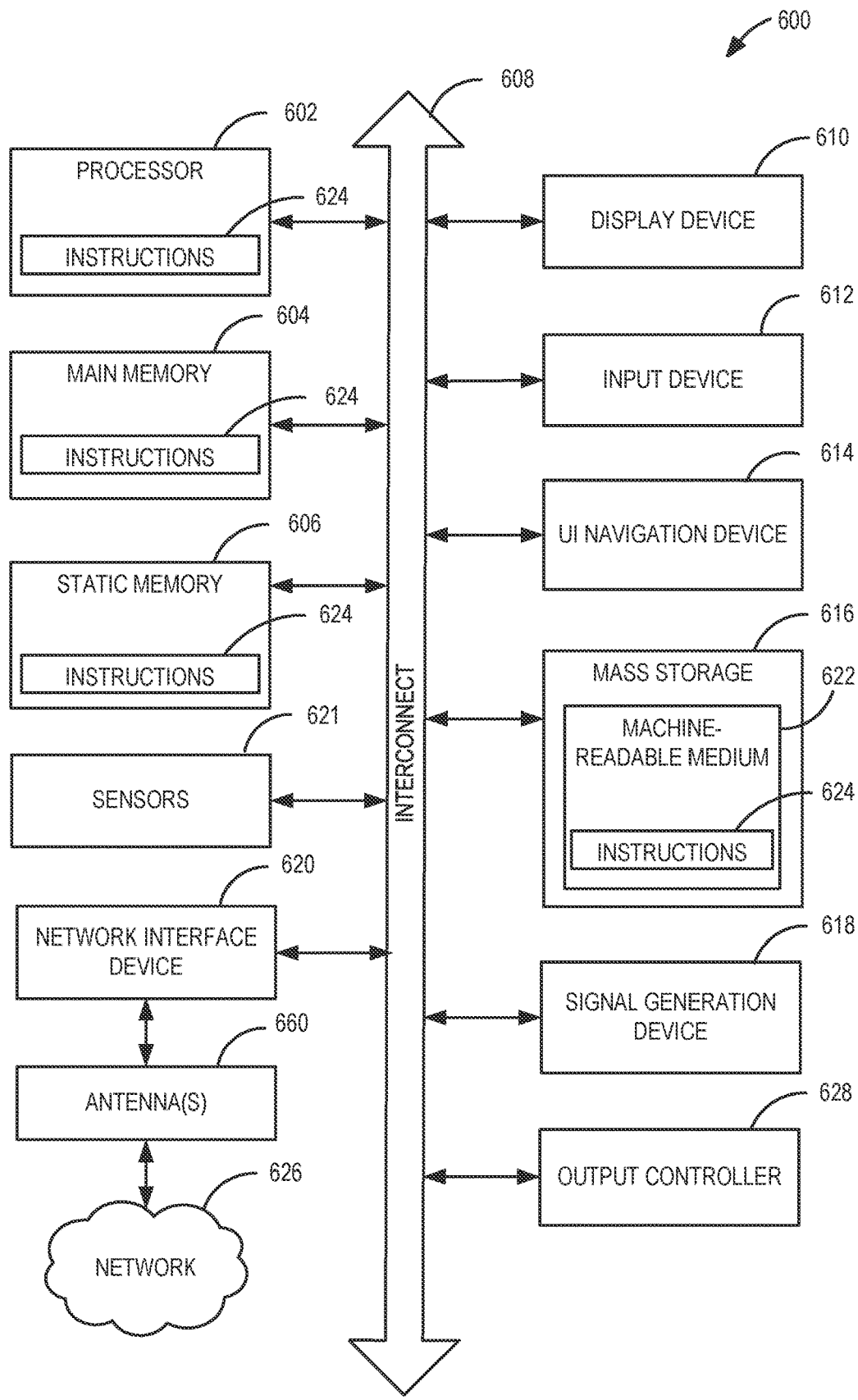
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UT navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
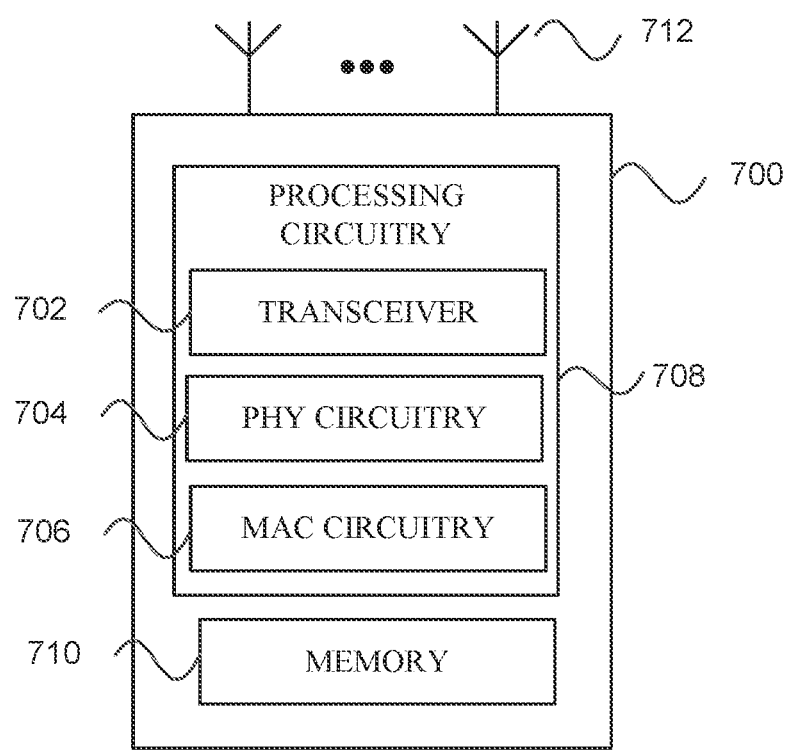
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PITY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RE signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PBX circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), anti/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
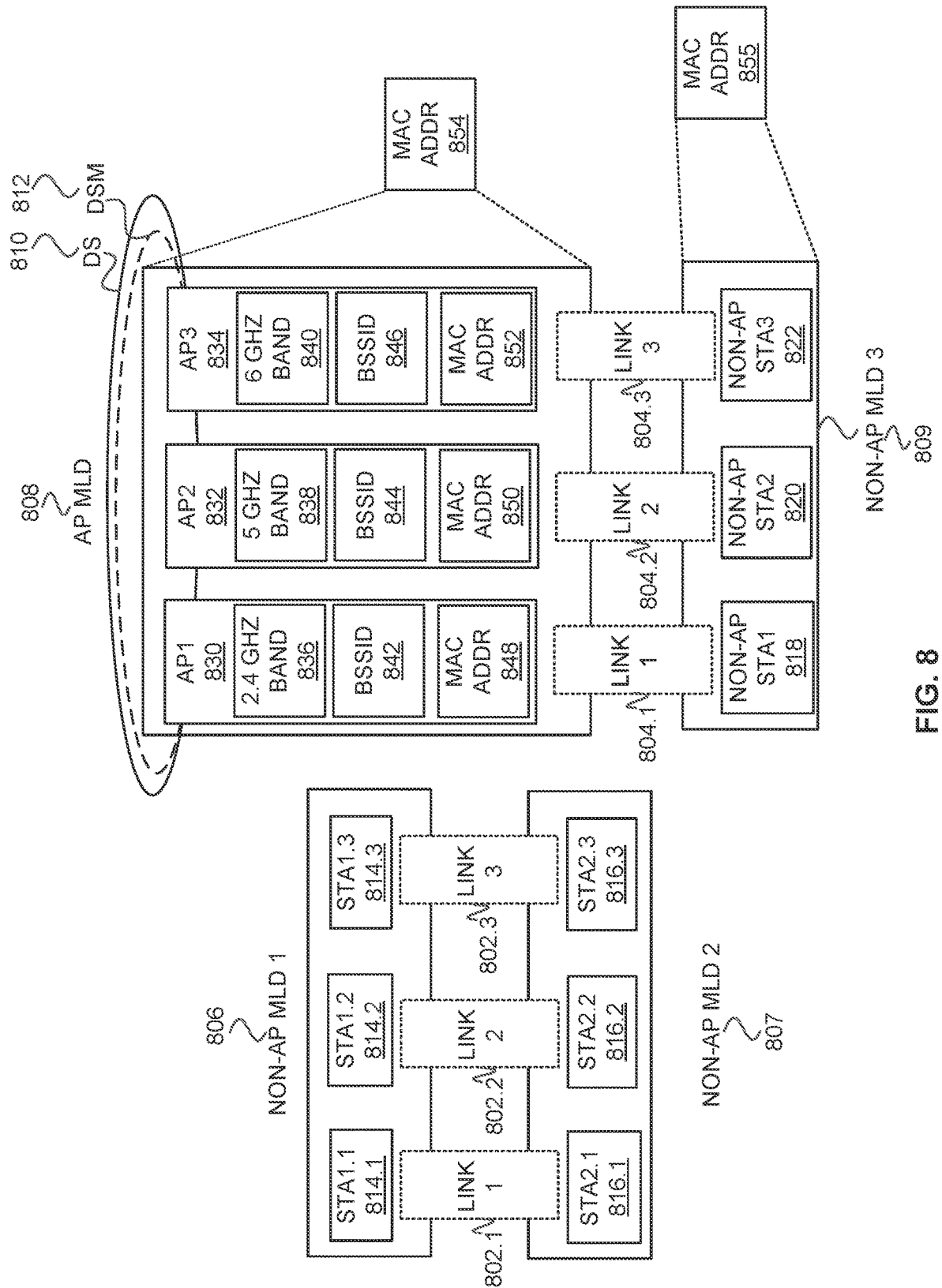
FIG. 8 illustrates MLDs, in accordance with some embodiments.

FIG. 8 illustrates MLDs, in accordance with some embodiments. Illustrated in FIG. 8 is ML logical entity 1 or non-AP MLD 1 806, ML logical entity 2 or non-AP MLD 2 807, ML AP logical entity or AP MLD 808, and ML non-AP logical entity or non-AP MLD 3 809. The non-AP MLD 1 806 includes three STAs, STA1.1 814.1, STA1.2 814.2, and STA1.3 814.3 that operate in accordance with link 1 802.1, link 2 802.2, and link 3 802.3, respectively. The Links are different frequency bands such as 2.4 GHz band, 5 GHz band, 6 GHz band, and so forth. non-AP MLD 2 807 includes STA2.1 816.1, STA2.2 816.2, and STA2.3 816.3 that operate in accordance with link 1 802.1, link 2 802.2, and link 3 802.3, respectively. In some embodiments non-AP MLD 1 806 and non-AP MLD 2 807 operate in accordance with a mesh network. Using three links enables the non-AP MLD 1 806 and non-AP MLD 2 807 to operate using a greater bandwidth and to operate more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum.

AP MLD 808 includes AP1 830, AP2 832, and AP3 834 operating on link 1 804.1, link 2 804.2, and link 3 804.3, respectively, AP MLD 808 includes a MAC address 854 that may be used by applications to transmit and receive data across one or more of AP1 830, AP2 832, and AP3 834.

AP1 830, AP2 832, and AP3 834 include a frequency band, which are 2.4 (kHz band 836, 5 GHz band 838, and 6 GHz band 840, respectively. AP1 830, AP2 832, and AP3 834 includes different BSSIDs, which are BSSID 842, BSSID 844, and BSSID 846, respectively. AP1 830, AP2 832, and AP3 834 include different media access control (MAC) address (addr), which are MAC adder 848, MAC addr 850, and MAC addr 852, respectively. The AP 502 is an AP MLD 808, in accordance with some embodiments. The STA 504 is a non-AP MLD 3 809, in accordance with some embodiments.

The non-AP MLD 3 809 includes non-AP STA1 818, non-AP STA2 820, and non-AP STA3 822. Each of the non-AP STAs have a MAC address (not illustrated) and the non-AP MLD 3 809 has a MAC address 855 that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as non-AP MLD 1 806 or non-AP MLD 2 807, is a logical entity that contains one or more STAs 814, 816. The non-AP MLD 1 806 and non-AP MLD 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address, in accordance with some embodiments. In some embodiments a same MAC address is used for application layers and a different MAC address is used per link 802.

In infrastructure framework, AP MLD 808, includes APs 830, 838, 840, on one side, and non-AP MLD 3 809 includes non-APs STAs 818, 820, 822 on the other side. AP MLD 808 is a ML logical entity, where each STA within the multi-link logical entity is an HIT AP 502, in accordance with some embodiments. Non-AP MLD 1 806, non-AP MLD 2 807, non-AP MLD 809 are multi-link logical entities, where each STA within the multi-link logical entity is a non-AP EHT STA 504. AP1 830, AP2 832, and AP3 834 may be operating on different bands and there may be fewer or more APs. STA1.1 814.1, STA1.2 814.2, and STA1.3 814.3 may be operating on different bands and there may be fewer or more STAs as part of the non-AP MLD 3 809.

In some embodiments, a multi-link device (MLD), 806 or 807, is a device that is a logical entity and has more than one affiliated station (STA), e.g., STAs 814, and has a single medium access control (MAC) service access point (SAP) to logical link control (LLC), which includes one MAC data service.

Figure 9:
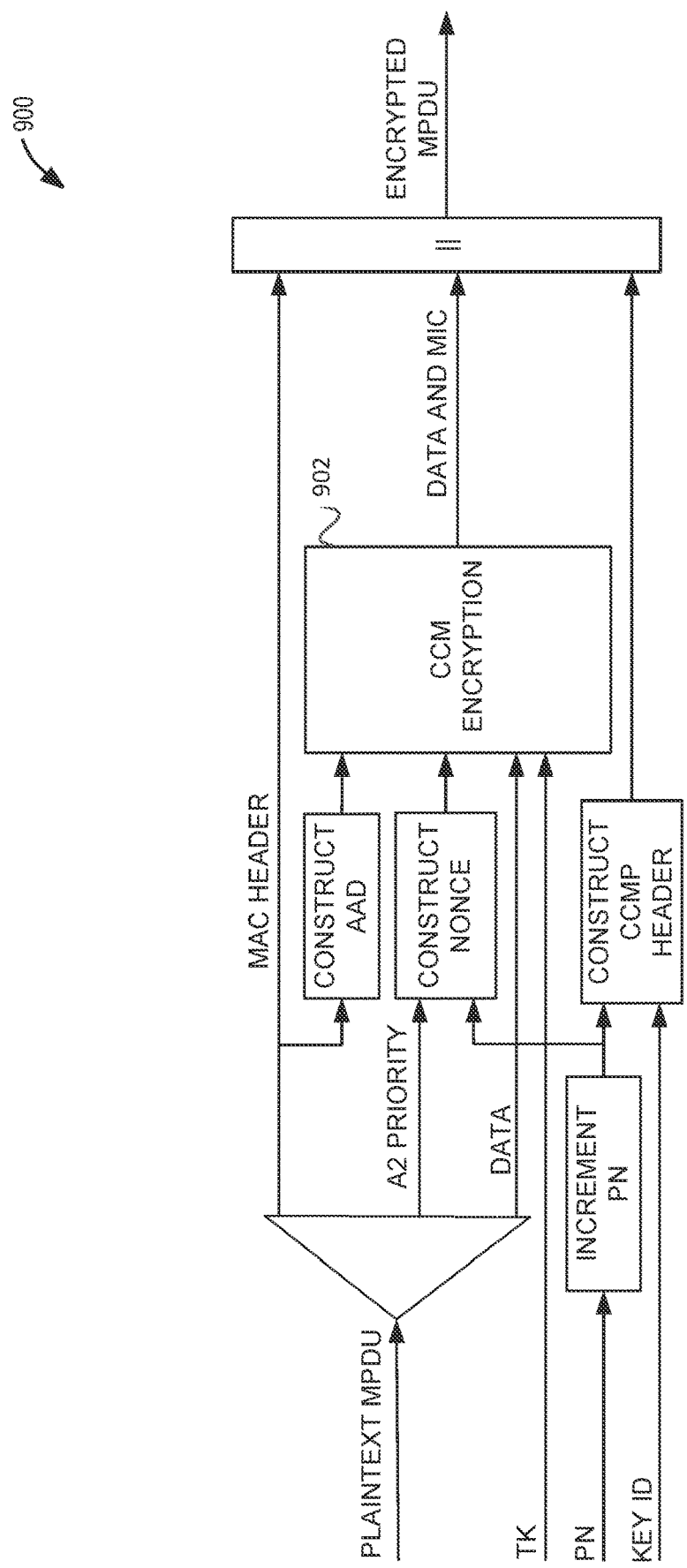
FIG. 9 illustrates an encapsulation block diagram, in accordance with some embodiments.
Figure 10:
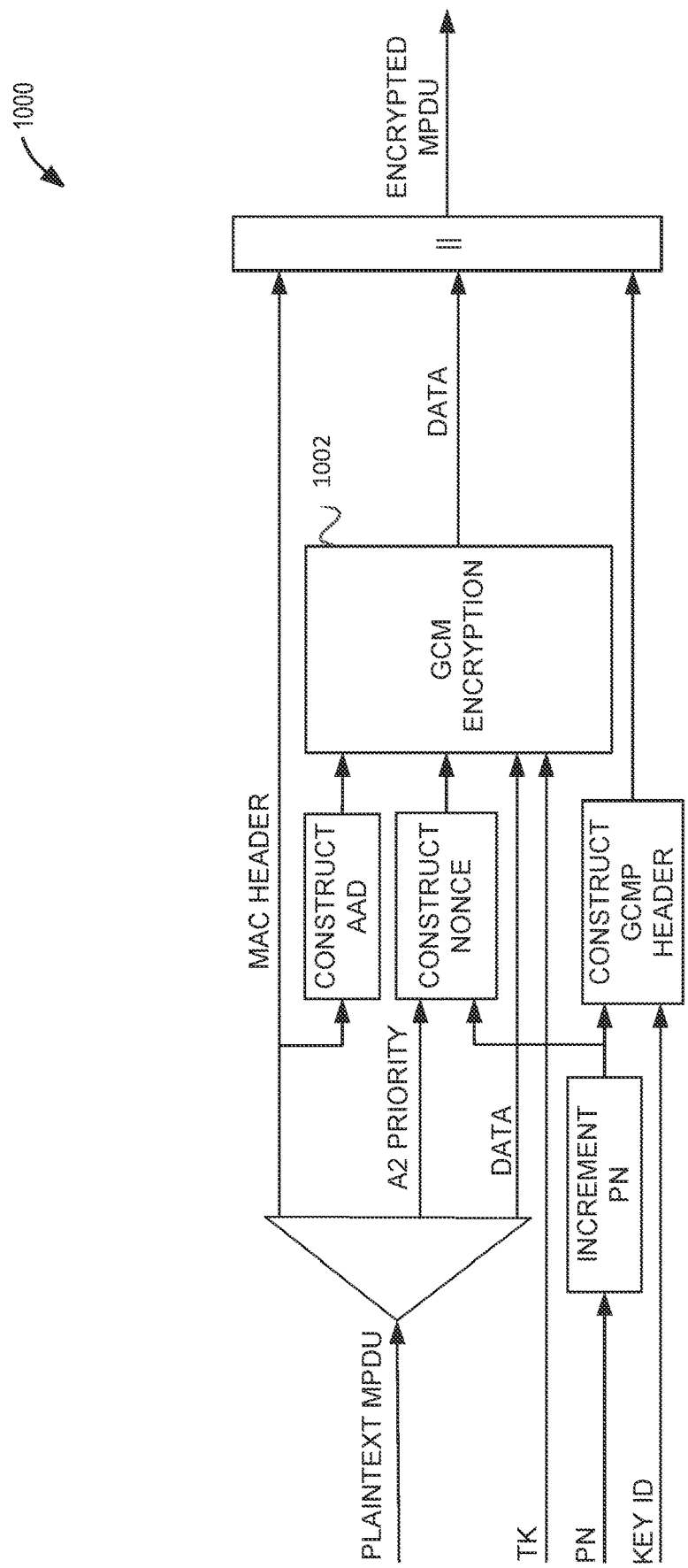
FIG. 10 illustrates an encapsulation block diagram, in accordance with some embodiments.

FIG. 9 illustrates an encapsulation block diagram 900, in accordance with some embodiments. FIG. 10 illustrates an encapsulation block diagram 1000, in accordance with some embodiments. To protect individually addressed frame, two MLDs, e.g., AP MLD 808 and no-AP MLD 3 809, perform a 4-way handshake to generate a common pairwise transient key (PTK) that can be used to protect individually addressed frames including individually addressed data frame and individually addressed management frame. The PTK is shared across links, e.g., 804.1, 804.2, and 804.3, by the MLDs, e.g., AP MLD 808 and no-AP MLD 3 809. In some embodiments, there is a corresponding packet number (PN) space used in the nonce construction to avoid replay attack. The encryption or protection may use CCMP as illustrated in FIG. 9 or GCMP as illustrated in FIG. 10, Payload protected (PP) aggregate medium access control (MAC) service data unit (A-MSDU) is an A-MSDU that is protected with counter mode (CTR) with cipher-block chaining message authentication code (CBC-MAC) protocol (CCMP) or Galois/counter mode (GCM) protocol (GCMP) but does not include the A-MSDU present field (bit 7 of the QoS Control field) in the construction of the additional authentication data (AAD), in accordance with some embodiments. CMM encryption 902 is illustrated in FIG. 9. GCM encryption 1002 is illustrated in FIG. 10.

Figure 11:
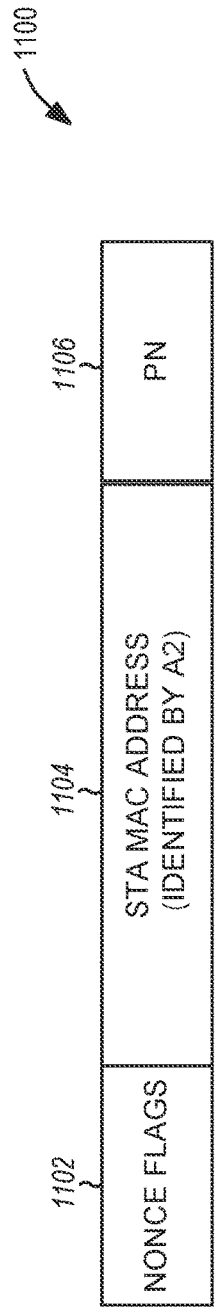
FIG. 11 illustrates nonce construction, in accordance with some embodiments.

FIG. 11 illustrates nonce construction 1100, in accordance with some embodiments. Illustrated in FIG. 11 is nonce flags 1102, STA MAC address 1104, which may be identified by A2 (which is the address 2 field of the MAC header), and a packet number (PN) 1106. FIG. 11 is the nonce for CCMP.

Figure 12:
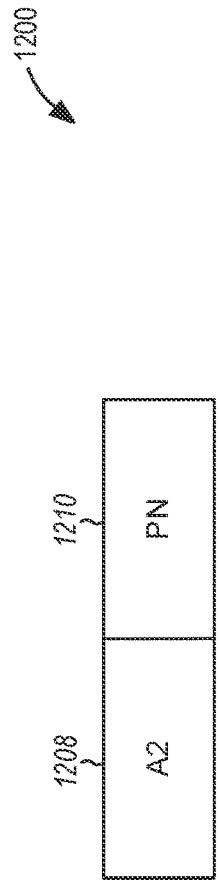
FIG. 12 illustrates nonce construction, in accordance with some embodiments.

FIG. 12 illustrates nonce construction 1200, in accordance with some embodiments. Illustrated in FIG. 12 is A2 1208 and PN 1210. FIG. 12 is the nonce for GCMP.

Figure 13:
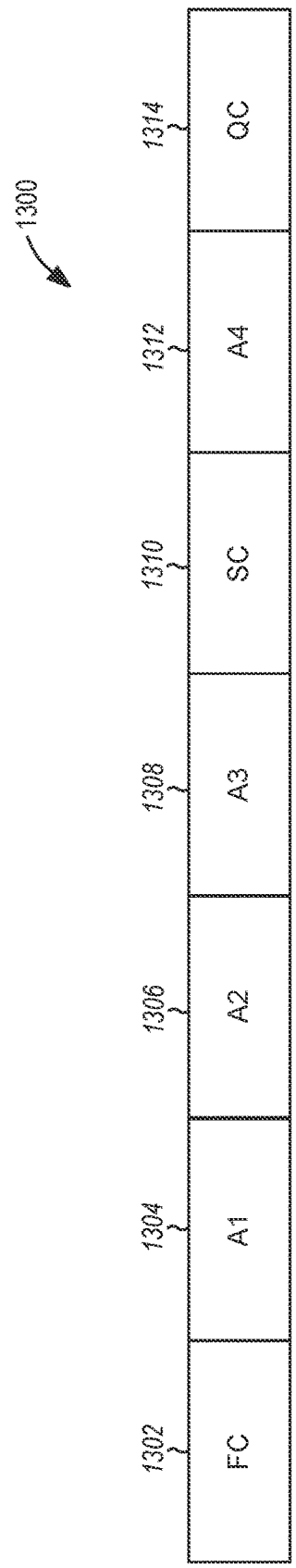
FIG. 13 illustrates additional authentication data (AAD), in accordance with some embodiments.

FIG. 13 illustrates additional authentication data (AAD) 1300, in accordance with some embodiments. Illustrated in FIG. 13 is frame control (FC) 1302, A1 1304, A2 1306, A3 1308, SC 1310, A4 1312, and QC 1314.

Figure 14:
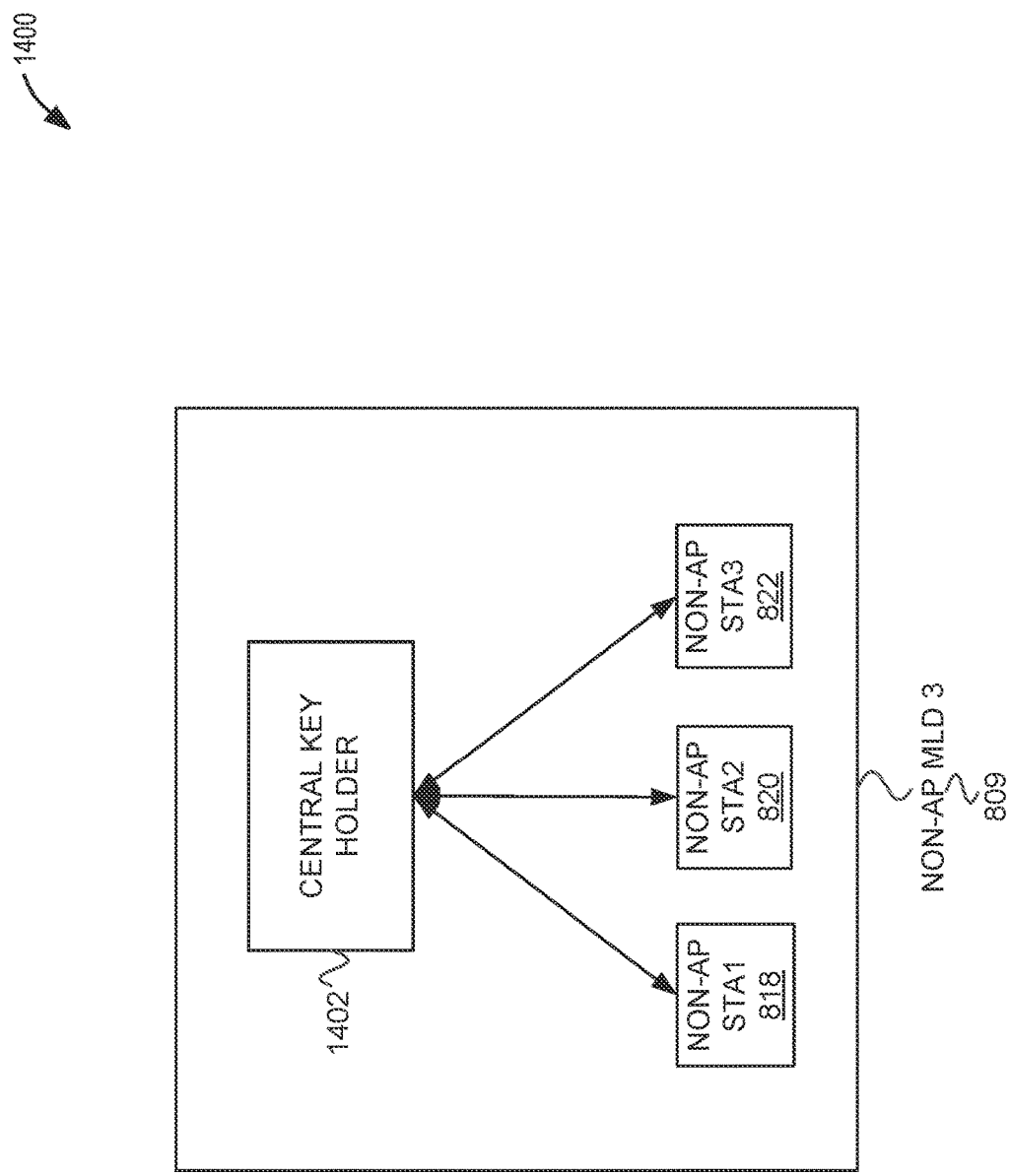
FIG. 14 illustrates a system for a central key holder, in accordance with some embodiments.

FIG. 14 illustrates a system 1400 for a central key holder, in accordance with some embodiments. Illustrated in FIG. 14 is non-AP MLD 3 809 with central key holder 1402. In some embodiments, where there are certain security requirements, a central key holder meets security requirements to perform all the encryption and decryption. In an example, the frames received by non-AP STAT 818, non-AP STA2 820, and non-AP STA3 822 will be passed to central key holder 1402 for decryption. In an example the data frame is passed from higher layer will be encrypted by the central key holder 1402 before passing down to a STA, e.g, non-AP STA1 818, non-AP STA2 820, or non-AP STA3 822, for transmission. In an example if the management frame is generated locally by a STA, e.g, non-AP STA1 818, non-AP STA2 820, or non-AP STA3 822, then it will be passed up to the central key holder 1402 for decryption before passing hack for transmission.

In some embodiments a Multi-link individual addressed frame is retransmitted using a central key holder 1402. In some embodiments, the MAC addresses are different for different STAB in a MLD, when a frame is transmitted in different links, then the encryption is different. As a result, the frame needs to be passed to the central key holder 1402 to be encrypted again before it is sent out.

In some embodiments, the AAD 1300 is constructed for A1, A2, A3, A4 with the MLD MAC address 855 that the STA, e.g., non-AP STA1 818, non-AP STA2 820, non-AP STA3 822, is affiliated with rather than using the STA addresses of A1, A2, A3, A4, if A4 exists. As a result, independent of the links, e.g., 804.1, 804.2, 804.3, that the frame is transmitted to, the encryption is always the same, and there is no need to pass the frame to central key holder 1402 again. In some embodiments, the encryption and construction of AAD 1300 is different for each link, e.g., 804.1, 804.2, 804.3.

In some embodiments, when an individually addressed management frame is transmitted in a link, e.g., 804.1, 804.2, 804.3, the management frame is meant to be specific for that link. However, under AAD 1300 swap proposal (where the MLD MAC address or addresses are used), the management frame transmitted in a link can then be replayed by an attacker in any link and might treated as valid management frame, which may interfere with the operation of the STAs or MLD. As a result, an attacker can then confuse the receiving MLD by treating a management frame intended for say link 1 as for link 2, which then creates operation disruption. A technical problem is how to transmit a management frame on a link, e.g., 804.1, 804.2, 804.3, for another link of the MLD, e.g., AP MLD 808 or non-AP MLD 3 809. There is also a technical problem of how to permit the following cases for transmission of a management frame between two MLDs. Case 1: how to permit a management frame to be transmitted on a first link and have the contents apply to a second link. Case 2: how to permit a management frame to be transmitted on a first link and have the contents apply to different links, Case 3: how to permit a management frame transmitted contents to apply to more than one link. And, case 4: how to permit management frames of different types to apply to different set of links Some embodiments address these technical problem as follows. A link ID or link ID bitmap is included in the frame body of a management frame, which enables the following. Enable contents of a management frame to be transmitted on a first link and apply to a second link. Enable contents of a management frame to apply to different links. Enable contents of a management frame to apply to more than one link. In some embodiments a link ID or link ID bitmap is included in the frame body of an individually addressed management frame when the A1, A2, A3, A4 (if present) in AAD 1300 are swapped for the corresponding MLD MAC address. Some embodiments enable the contents of a management frame to be transmit on one link and be applied to a different link. Some embodiments enable the contents of a management frame to be transmitted on a first link and apply to different links. Some embodiments enable the contents of a management frame to be transmitted on a first link and apply to more than one link. Some embodiments enable different types of management frames to be transmitted in a single management frame where the different management frames apply to different groups of links. In some embodiments the individually addressed management frame is not vulnerable to a replay problem when AAD swap is used, which minimizes having to use a central key holder 1402 for reencryption.

In some embodiments, the link information indication can be a field for link ID or a field with link ID bitmap. The field for link ID will is 4 bits, in accordance with some embodiments. The field for link ID bitmap will is 16 bits, in accordance with some embodiments. The link ID can be used when the content is applied to only one link, in accordance with some embodiments. The Link ID bitmap can be used when the content is applied to more than one link, in accordance with some embodiments.

In some embodiments, the link information can be included in one or more of the following places. In a specific element where the element can be the first element among all the other elements, which then indicates the rest of the content in the frame body applies to link(s) indicated by the link information; or where there can be several such elements with link information to indicate elements following element indicating link information (say link information 1) before elements indicating link information 2 is for links) indicated by link information 1.

Or the link information is part of an element where this is useful when some elements in the management frame body applies to link(s) indicated by one link information and some elements in the management frame body applies to link(s) indicated by another link information.

Individually addressed management frames when the A1, A2, A3, A4 (if present) in AAD are swapped for the corresponding MLD MAC address include link information in the frame body, in accordance with some embodiments. The individually addressed management frames that are MLD level, which can be accepted in any link anyway is exempted from the requirement to include link information. The MLD level individually addressed management frame includes but not limited to ADDBA request/response and ADDIS request/response.

In some embodiments, to include link information in a different/same type of management frame one of the following may be applied: a specific designed public action frame or protected dual of public action frame or public action frame. The Action frame can include one or more MMPDU descriptors in the action field. The MMPDU descriptor has a MMPDU frame length, MMPDU frame control, and MMPDU frame body. Link information is included in a separate field part of the action header; a part of the MMPDU descriptor; or a part of the MMPDU framebody in the MMPDU descriptor as described above.

Figure 15:
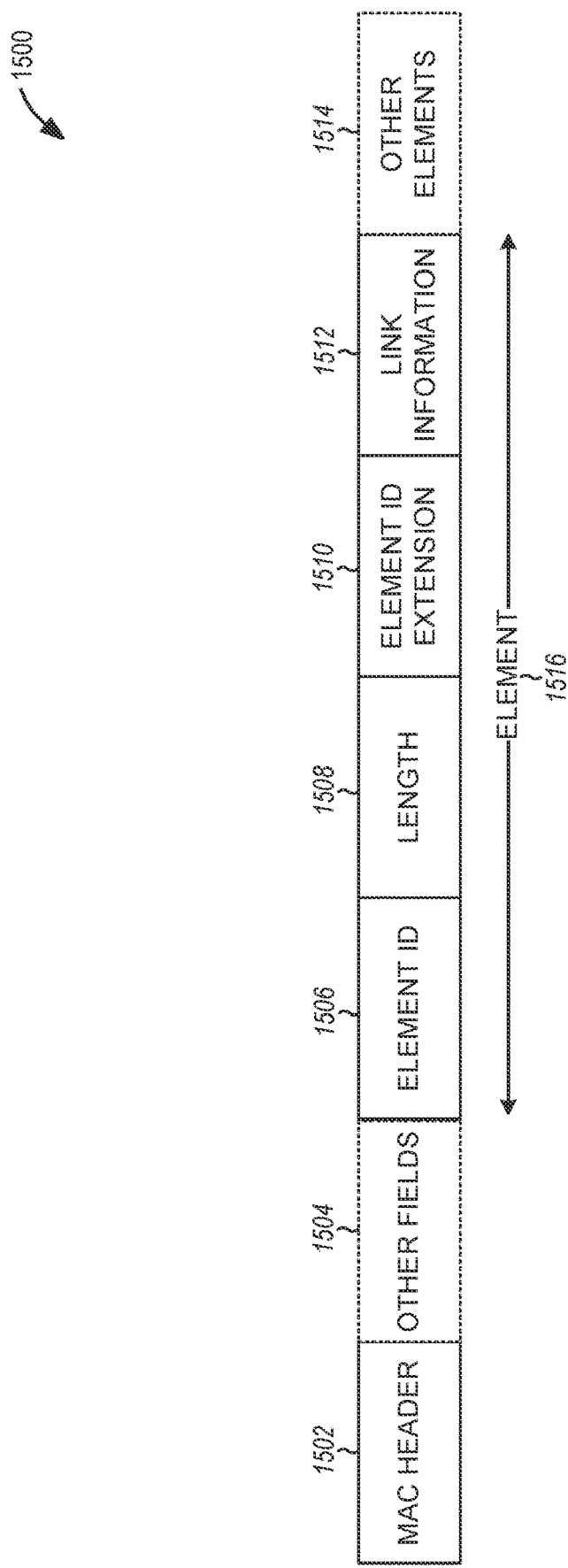
FIG. 15 illustrates an example link information, in accordance with some embodiments.

FIG. 15 illustrates an example link information 1512, in accordance with some embodiments. Illustrated in FIG. 15 is MAC header 1502, other field 1504, element ID 1506, length 1508, element M extension 1510, link information

1512, and other elements. The link Information 1512 is part of the first element 1516 among all the elements and indicates that the rest of elements are for the link(s), e.g., 804.1, 804.2, or 804.3, indicated by the link information 1512.

Figure 16:
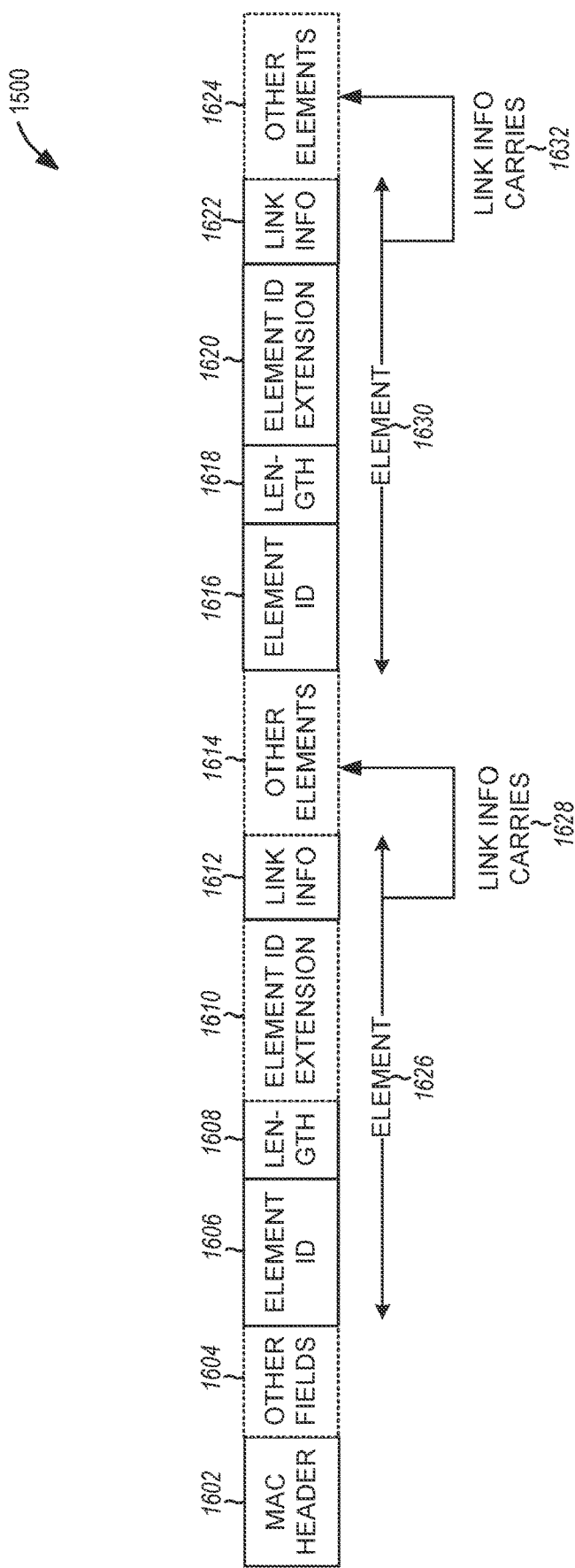
FIG. 16 illustrates an example link information, in accordance with some embodiments.

FIG. 16 illustrates an example link information, in accordance with some embodiments. Illustrated in FIG. 16 is MAC header 1602, other field 1604, element ID 1606, length 1608, element ID extension 1610, link information 1612, other elements 1614, element ID 1616, length 1618, element ID extension 1620, link info 1622, other elements 1624, element 1626, link info carries 1628, element 1630, and link info carries 1632. In some embodiments, several elements with link Information to differentiate which elements belong to what link. In some embodiments, the link information 1612 in the element 1626 applies to subsequent elements (other elements 1614) until another element 1630 includes link info 1622.

FIG. 17 illustrates an example link information, in accordance with some embodiments. Illustrated in FIG. 17 is MAC header 1702, other field 1704, element ID 1706, length 1708, element ID extension 1710, element content 1712, link information 1714, element ID 1716, length 1718, element ID extension 1720, element content 1722, and link info 1724. In some embodiments, the link information 1714, 1724 is included an element to indicate which element belongs to what link, e.g., link information 1714 applies to the element with element ID 1706 and link info 1724 applies to the element with element ID 1716.

Figure 18:
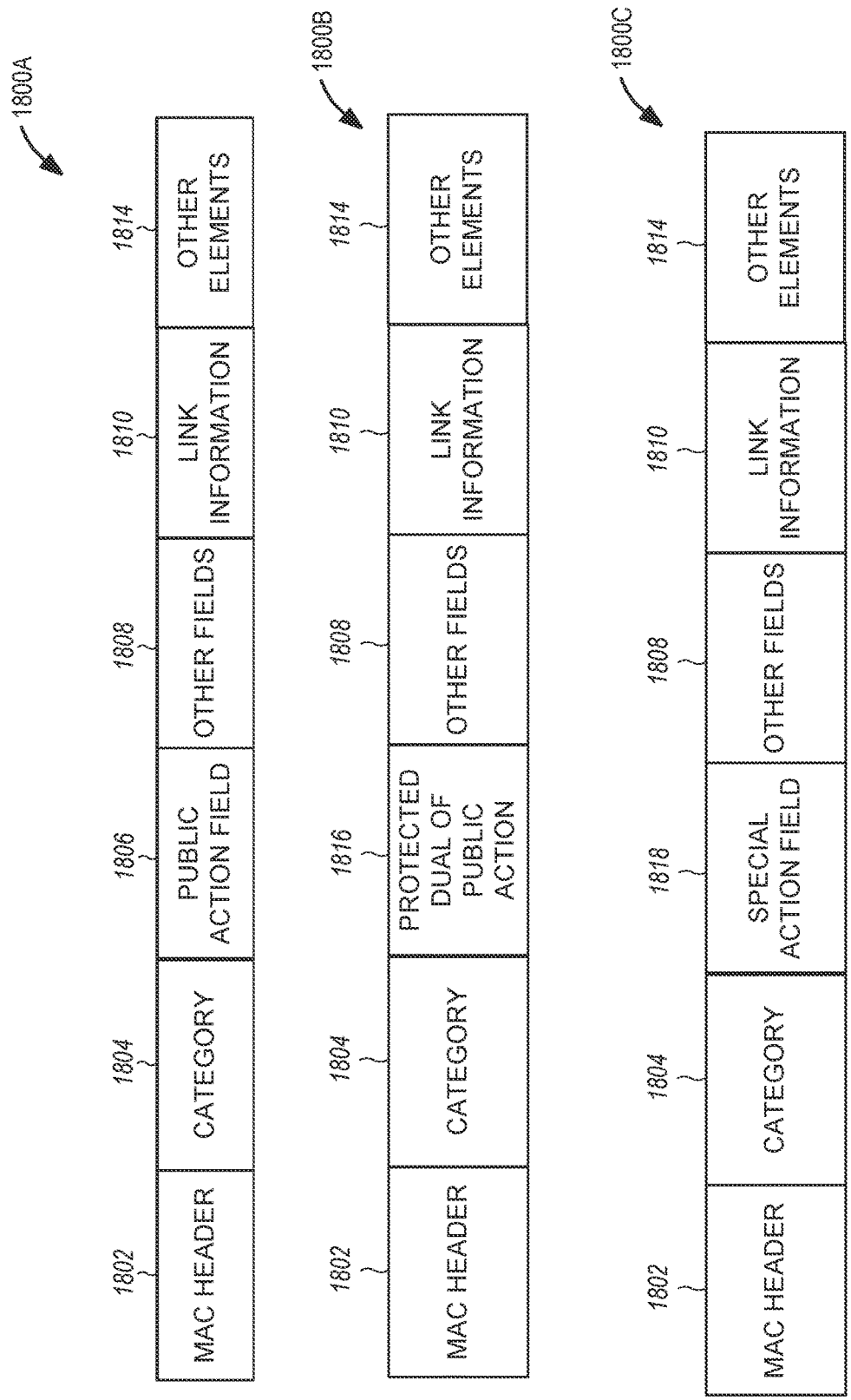
FIG. 18 illustrates an example link information, in accordance with some embodiments.

FIG. 18 illustrates an example link information, in accordance with some embodiments. Illustrated in FIG. 18 is MAC header 1802, category 1804, public action field 1806, other fields 1808, link information 1810, other elements 1814, protected dual of public action 1816, and special action field 1818. The link information 1810 in the fields indicates the link information for a defined Action frame header like public action 1806, protected dual of public action 1816, or specific Action 1818.

Figure 19:
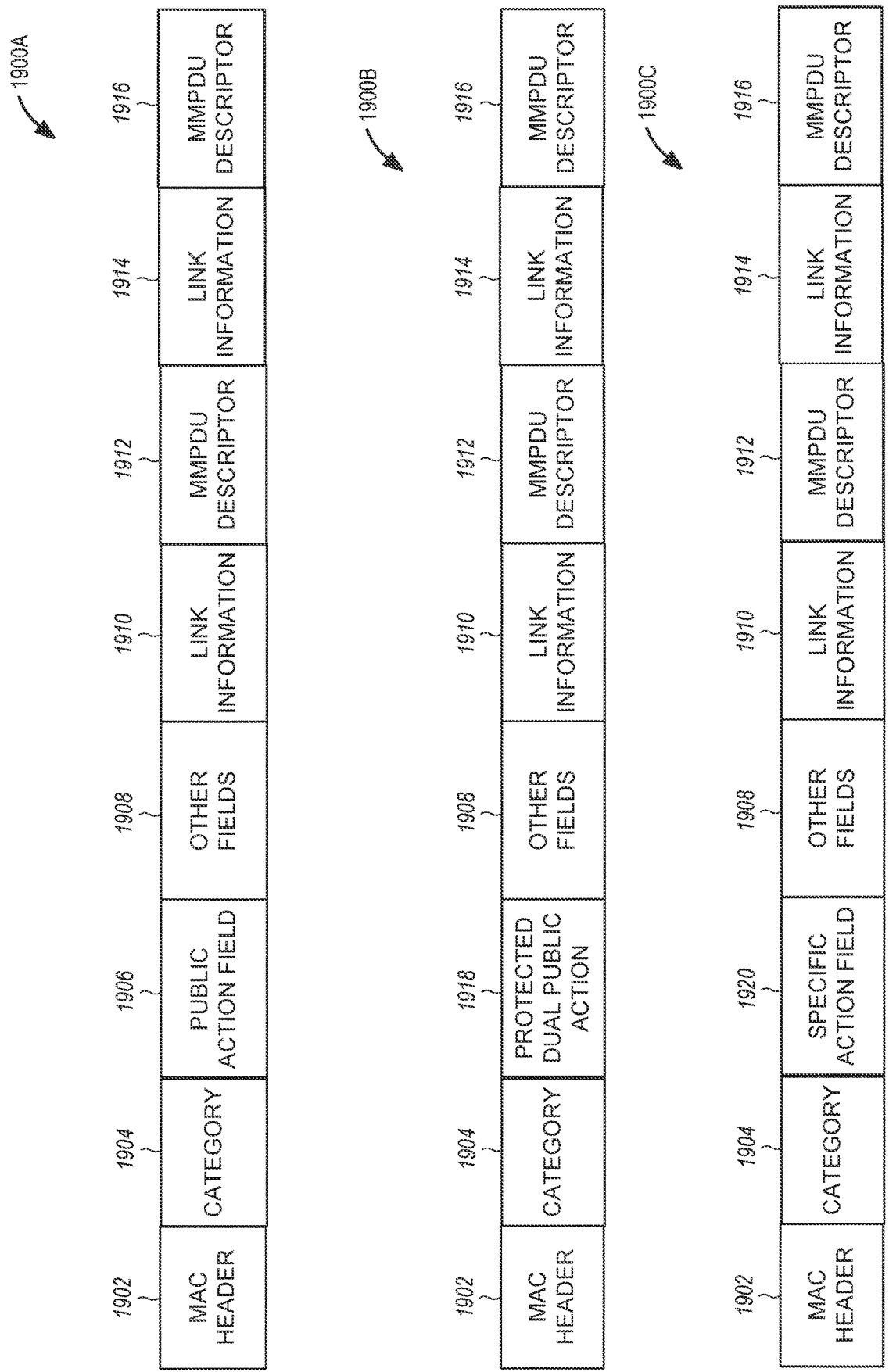
FIG. 19 illustrates an example link information, in accordance with some embodiments.

FIG. 19 illustrates an example link information, in accordance with some embodiments. Illustrated in FIG. 19 is MAC header 1902, category 1904, public action field 1906, other fields 1908, link information 1910, MMPDU descriptor 1912, link information 1914, MMPDU descriptor 1916, protected dual public action 1918, and specific action field 1920. In some embodiments, link information 1910, 1914 in the fields indicates the links for a defined action frame header like public action 1906 (frame 1900A), protected dual of public action 1918 (frame 1900B), or specific Action 1920 (frame 1900C) design for these purpose followed by the MMPDU descriptor 1912, 1916 that includes the management frame contents indicated by the corresponding link information 1910, 1914.

Figure 20:
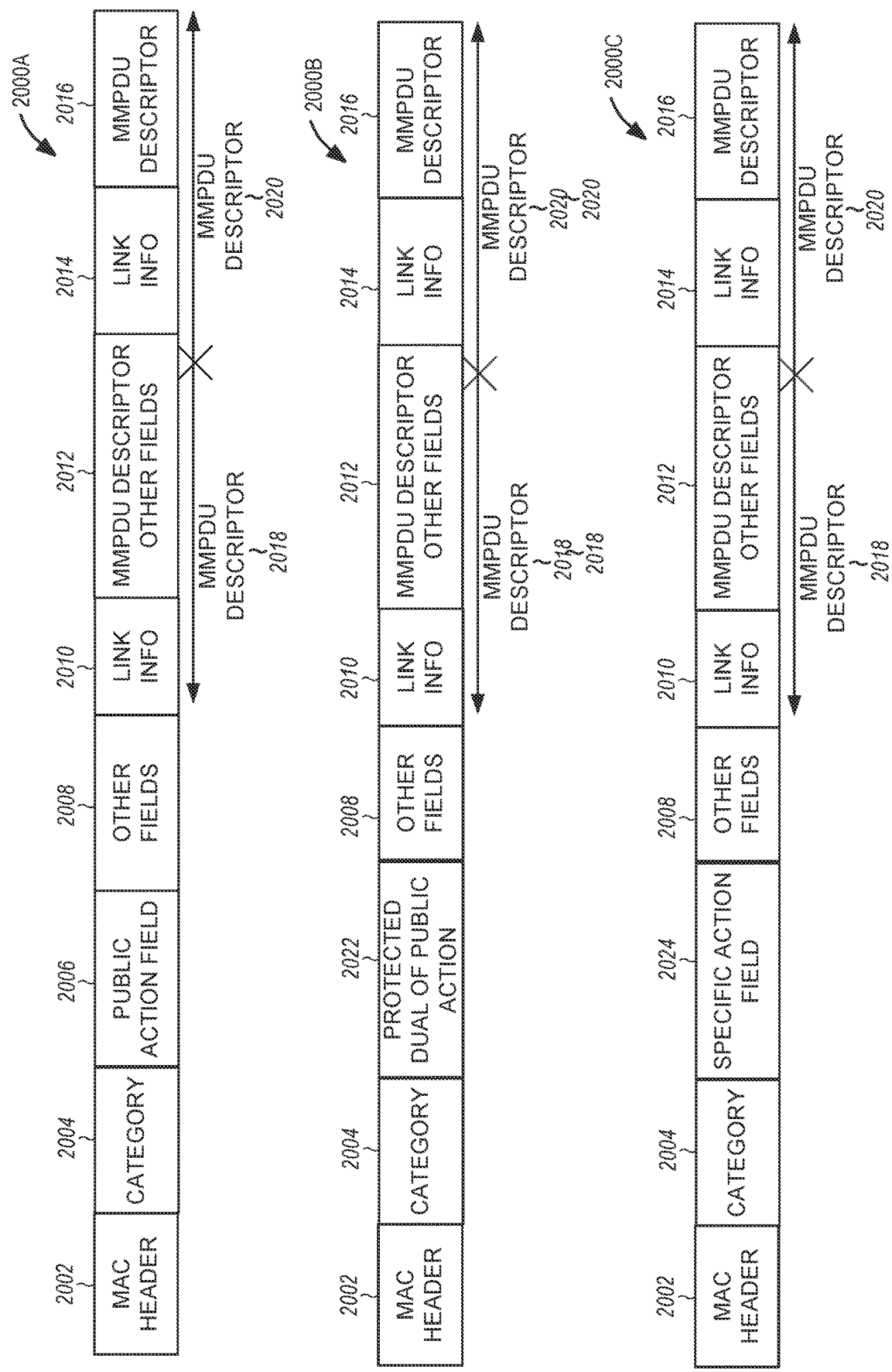
FIG. 20 illustrates an example link information, in accordance with some embodiments.

FIG. 20 illustrates an example link information, in accordance with some embodiments. Illustrated in FIG. 20 is MAC header 2002, category 2004, public action field 2006, other fields 2008, link information 2010, MMPDU descriptor other fields 2012, link information 2014, MMPDU descriptor 2016, MMPDU descriptor 2018, MMPDU descriptor 2020, protected dual public action 2022, and specific action field 2024. Illustrated in FIG. 20 is the link info 2010, 2014 being part of the MMPDU descriptor 2018, 2020, respectively, with a frame 2000A with a public action field 2006, a frame 2000B with a protected dual of public action 2022, and a frame 2000C with a specific action field 2024.

Figure 21:
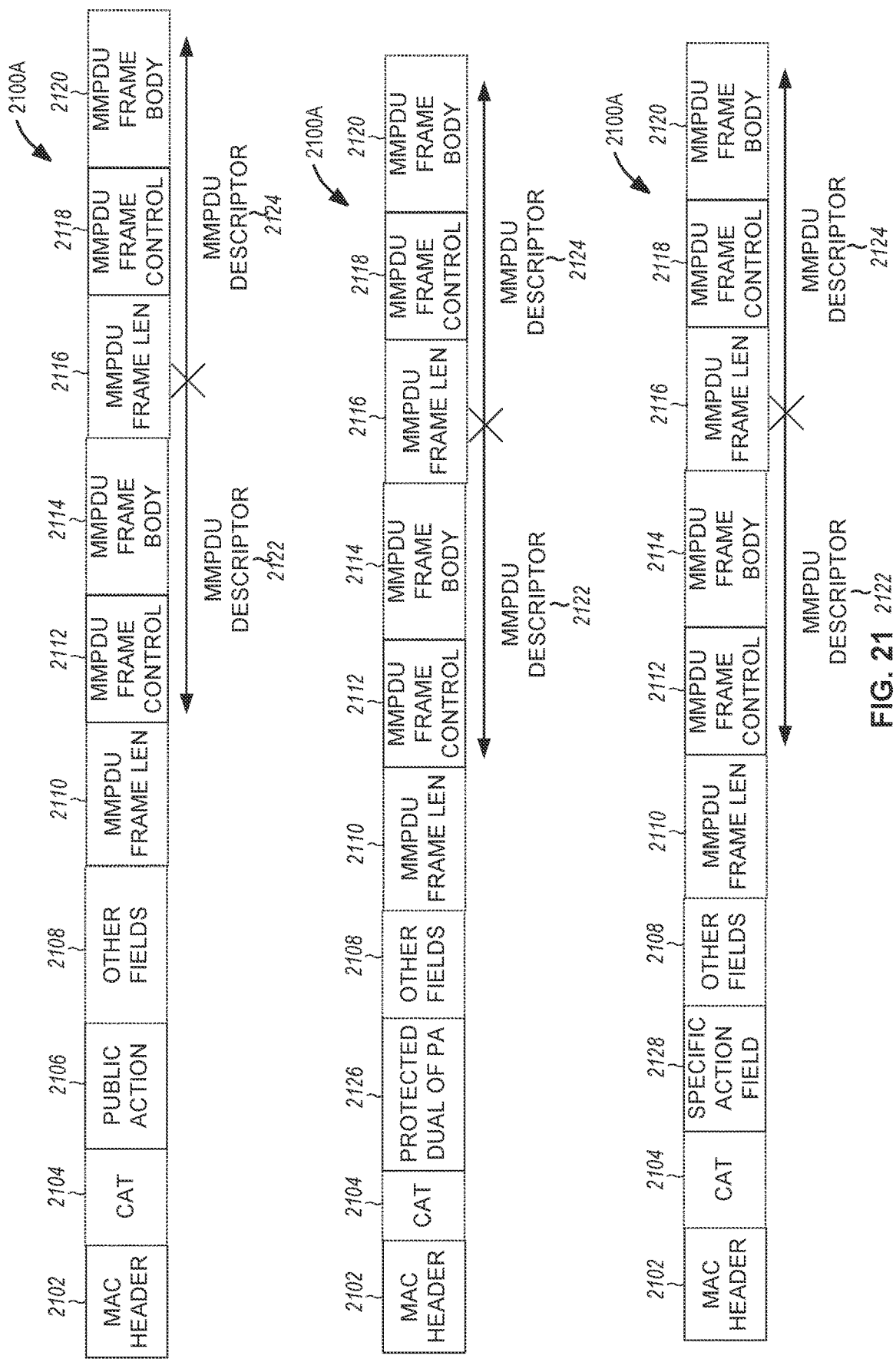
FIG. 21 illustrates an example link information, in accordance with some embodiments.

FIG. 21 illustrates an example link information, in accordance with some embodiments. Illustrated in FIG. 21 is MAC header 2102, category 2104, public action field 2106, other fields 2108, MMPDU frame length 2110, MMPDU frame control 2112, MMPDU frame body 2114, MMPDU frame length 2116, MMPDU frame control 2118, MMPDU frame body 2120, MMPDU descriptor 2122, MMPDU descriptor 2124, protected dual of PA 2126, and specific action field 2128. Illustrated in FIG. 21 is the link info being part of the MMPDU frame body of the MMPDU descriptor 2122, 2124 as described herein, e.g., FIGS. 15-17, for frame 2100A with a public action field 2106, a frame 2100B with a protected dual of public action 2126, and a frame 2100C with a specific action field 2128.

Figure 22:
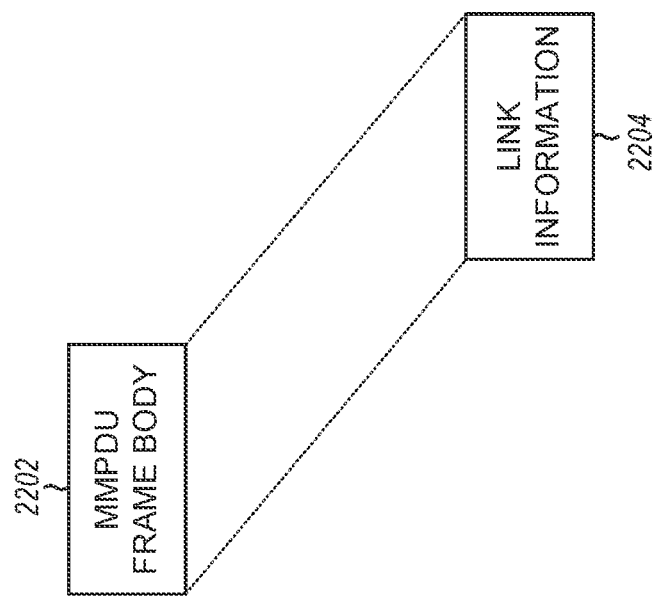
FIG. 22 illustrates an example link information, in accordance with some embodiments.

FIG. 22 illustrates an example link information, in accordance with some embodiments. MMPDU frame body 2202 includes link information 2204 where the link information 2204 indicates for which links of the MLD the MMPDU frame body 2202 are applicable.

Figure 23:
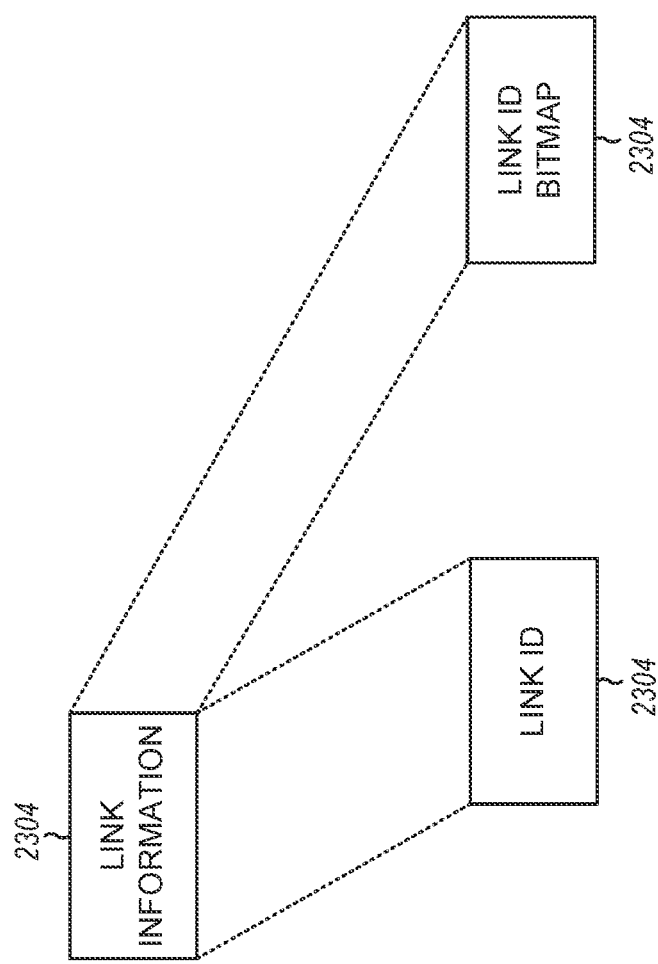
FIG. 23 illustrates link information, in accordance with some embodiments.

FIG. 23 illustrates link information 2304, in accordance with some embodiments. The link information 2304 may be a link ID 2304 indicating a specific link where the link ID 2304 is a number of bits such as 4, 8, 16, or 32, and the indicates a number that identifies the link of the MLD. Link ID bitmap 2304 is a number of bits such as 4, 8, or 16, where a bit of the link ID bitmap 2304 is mapped to a link of the MLD and a value of the mapped bit indicates whether the applicable management frame or element is applicable to the link corresponding to the mapped bit, e.g., the link ID bitmap 2304 may be 16 bits with each bit corresponding to a link of the MLD. In some embodiments, the link information 2304 is included in an element, data portion of a management frame, or in a header portion of the management frame and indicates the link or links that are applicable. In some embodiments, the link information 2304 is optional depending on whether the non-AP MLD or the AP ATM is transmitting the management frame or element.

In the FIGS., e.g., FIGS. 15-23, one or more of the fields may be optional and one or more additional fields may be added. Moreover, the fields may be in a different order.

The management frame may be one of the following an RTS, a CTS, a DMG Clear to send (DMG CTS), an Ack, a Grant, a SSW, a SSW-Feedback, a SSW-Ack, a Grant Ack, a CF-End, a Block Ack (BlockAck), a Block Ack Request (BlockAckReq), a Probe Request/Response, a Beacon, an Authentication, a Deauthentication, an ATIM, a Public Action, a Self-protected Action, an all Action frames and all Action No Ack frames, an Unprotected DMG Action frames, an Action and Action No Ack frames, an ADDTS Request, an ADDIS Response, a DELTS, a data frame, a DMG Beacon frames, an association Request/Response, a Reassociation Request/Response, a Disassociation, management frames between an AP MLD and a non-AP MLD associated with the AP MLD, a PS-Poll, a Poll, a SPR, a DMG DTS, a Block Ack (BlockAck), a Block Ack Request (BlockAckReq), a TWT frame, a multi-link element, a basic multi-link element, and so forth as described in IEEE 802.1be (D1.2 September 2021), IFEE 80211ax (D8.0, October 2020), and IEEE 802.11 (IEEE Std. 802.11-2020), which are included herein by reference.

Figure 24:
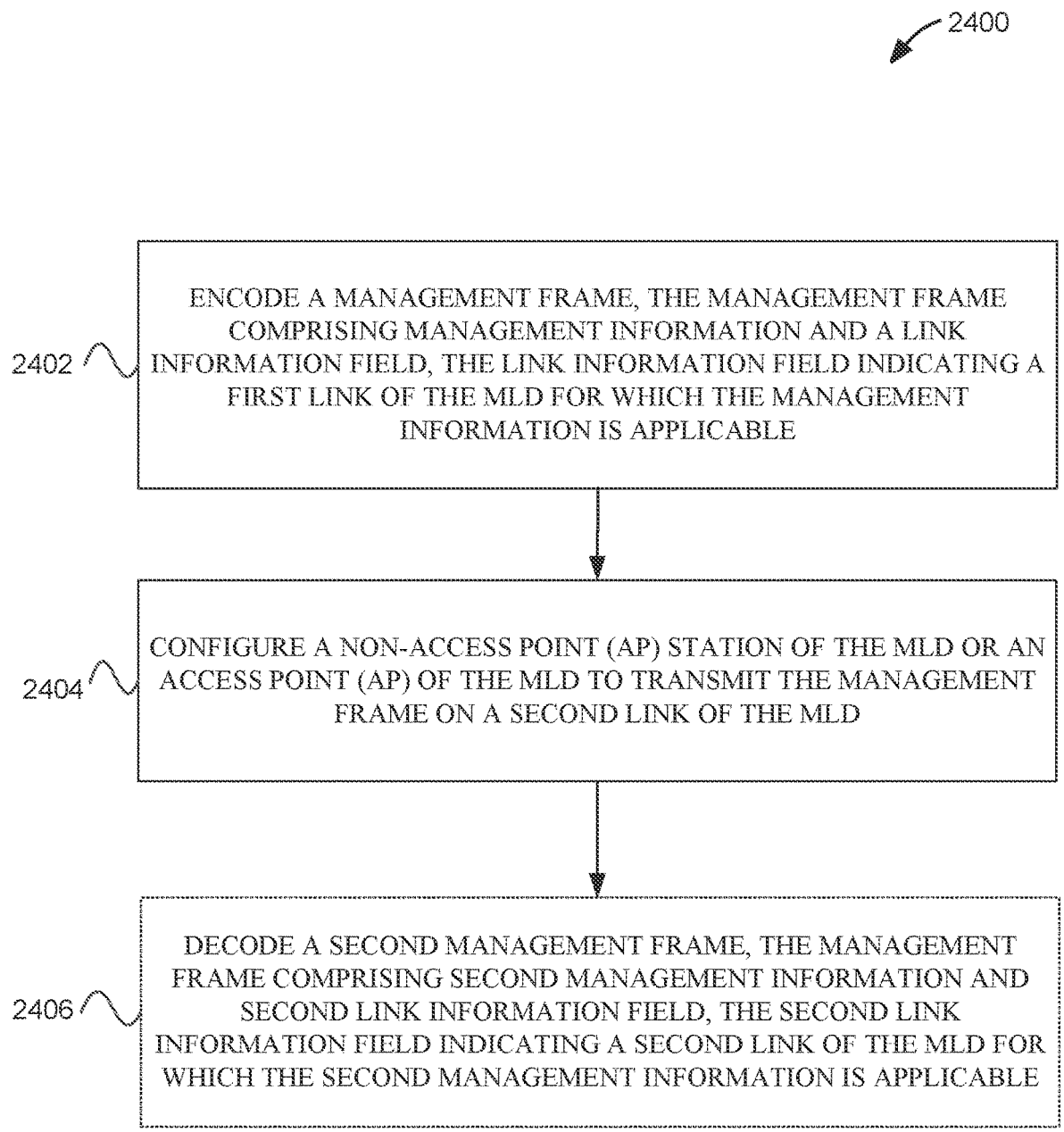
FIG. 24 illustrates a method 2400 of cross link management frame signaling, in accordance with some embodiments.

FIG. 24 illustrates a method 2400 of cross link management frame signaling, in accordance with some embodiments. The method 2300 begins at operation 2402 with encoding a management frame, the management frame comprising management information and a link information field, the link information field indicating a first link of the MLD for which the management information is applicable. For example, AP MLD 808 or non-AP MLD 3 809 may encode a management frame as disclosed in conjunction with FIGS. 9-22, Management information indicates one or more fields or one or more portions of the frame that includes information that is not the link information field, in accordance with some embodiments.

The method 2400 continues at operation 2404 with configuring a non-access point (AP) station of the MLD or an access point (AP) of the MLD to transmit the management frame on a second link of the MLD. For example, AP MLD 808, non-AP MLD 3 809, AP1 830, AP2 832, AP3 834, non-AP STA1 818, non-AP STA2 820, or non-AP STA3 822 may configure a management frame for transmission over link 1 804.1, link 2 804.2, or link 3 804.3.

Optionally, the method 2400 may include at operation 2406 with decoding a second management frame, the management frame comprising second management information and second link information field, the second link information field indicating a second link of the MLD for which the second management information is applicable. For example, AP MLD 808, non-AP MLD 3 809, AP1 830, AP2 832, AP3 834, non-AP STA1 818, non-AP STA2 820, or non-AP STA3 822 may decode a management frame from another MLD that indicates one or more links, link 1 804.1, link 2 804.2, or link 3 804.3, that are applicable for the management frame.

The method 2400 may be performed by an apparatus of a non-AP of a non-AP MLD or an apparatus of a non-AP MLD. The method 2300 may include one or more additional instructions. The method 2400 may be performed in a different order. One or more of the operations of method 2400 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-throughput (EHT) EHT access point (AP), the apparatus comprising: processing circuitry; and memory, the AP configured to operate as a first AP station (AP1) that is part of an AP multi-link device (AP MLD), the AP MLD being a first logical entity comprising at least two affiliated AP STAs including at least the AP1 and a second AP STA (AP2), the AP MLD configured to communicate over multiple links with a non-AP MLD (STA MLD) including at least a first link and a second link,
wherein for multi-link operation, the processing circuitry is configured to:
encode a management frame for transmission on the first link of the multiple links, the management frame encoded to include an element comprising a link ID bitmap identifying two or more of the multiple links including the second link to which the element applies; and
receive one or more medium access control (MAC) service data unit (MSDUs) from the STA MLD over two or more of the multiple links,
wherein when the element of the management frame is a target wake-up time (TWT) element, the link ID bitmap identifies two or more of the multiple links including the second link to which the TWT element applies.

2. The apparatus of claim 1, wherein the STA MLD is a second logical entity comprising at least two affiliated non-AP stations (STAs) including a first non-AP STA (STA1) and a second non-AP STA (STA2), and
wherein the first link is established between the AP1 and the STA1 and the second link is established between the AP2 and the STA2.

3. The apparatus of claim 2, wherein the AP MLD has a single medium access control (MAC) service access point (SAP) to logical link control (LLC), which includes one MAC data service interface.

4. The apparatus of claim 3, wherein the processing circuitry is configured to receive the MSDUs at the one MAC data service interface of the AP MLD from one MAC data service interface of the STA MLD across the multiple links.

5. The apparatus of claim 3, wherein when the element of the management frame is a Multi-Link Link Information element, the link ID bitmap identifies two or more of the multiple links including the second link to which the Multi-Link Link Information element applies.

6. The apparatus of claim 5, wherein the management frame is configured for transporting a medium access control (MAC) management protocol data unit (MMPDU), and
wherein the Multi-Link Link Information element is encoded to identify intended links of the multiple links of the MMPDU that carries the Multi-Link Link Information element.

7. The apparatus of claim 6, wherein the intended links comprise two or more of the multiple links and are identified in the link ID bitmap.

8. The apparatus of claim 1, wherein the processing circuitry comprises a baseband processor and the memory is configured to store the management frame.

9. A non-transitory computer-readable storage medium that stores instructions for execution by processing circuitry of an extremely high-throughput (EHT) EHT access point (AP), the AP configured to operate as a first AP station (AP1) that is part of an AP multi-link device (AP MLD), the AP MLD being a first logical entity comprising at least two affiliated AP STAs including at least the AP1 and a second AP STA (AP2), the AP MLD configured to communicate over multiple links with a non-AP MLD (STA MLD) including at least a first link and a second link,
wherein for multi-link operation, the processing circuitry is configured to:
encode a management frame for transmission on the first link of the multiple links, the management frame encoded to include an element comprising a link ID bitmap identifying two or more of the multiple links including the second link to which the element applies; and
receive one or more medium access control (MAC) service data unit (MSDUs) from the STA MLD over two or more of the multiple links,
wherein the element of the management frame is one of a target wake-up time (TWT) element and a Multi-Link Link Information element.

10. The non-transitory computer-readable storage medium of claim 9, wherein the STA MLD is a second logical entity comprising at least two affiliated non-AP stations (STAs) including a first non-AP STA (STA1) and a second non-AP STA (STA2), and
wherein the first link is established between the AP1 and the STA1 and the second link is established between the AP2 and the STA2.

11. The non-transitory computer-readable storage medium of claim 10, wherein the AP MLD has a single medium access control (MAC) service access point (SAP) to logical link control (LLC), which includes one MAC data service interface.

12. The non-transitory computer-readable storage medium of claim 11, wherein the processing circuitry is configured to receive the MSDUs at the one MAC data service interface of the AP MLD from one MAC data service interface of the STA MLD across the multiple links.

13. The non-transitory computer-readable storage medium of claim 11, wherein when the element of the management frame is the TWT element, the link ID bitmap identifies two or more of the multiple links including the second link to which the TWT element applies.

14. The non-transitory computer-readable storage medium of claim 11, wherein when the element of the management frame is the Multi-Link Link Information element, the link ID bitmap identifies two or more of the multiple links including the second link to which the Multi-Link Link Information element applies.

15. The non-transitory computer-readable storage medium of claim 14, wherein the management frame is configured for transporting a medium access control (MAC) management protocol data unit (MMPDU), and
wherein the Multi-Link Link Information element is encoded to identify intended links of the multiple links of the MMPDU that carries the Multi-Link Link Information element.

16. An apparatus of an extremely high-throughput (EHT) EHT non-access point station (STA), the apparatus comprising: processing circuitry; and memory, the STA configured to operate as part of a STA multi-link device (STA MLD), the STA MLD being a first logical entity comprising at least two affiliated STAs including at least a first STA (STA1) and a second STA (STA2), the STA MLD configured to communicate over multiple links with an AP MLD including at least a first link and a second link, wherein
wherein the AP MLD is a second logical entity comprising at least two affiliated AP stations (APs) including a first AP (AP1) and a second AP (AP2), the first link established between the AP1 and the STA1, the second link established between the AP2 and the STA2,
wherein for multi-link operation, the processing circuitry is configured to:
decode a management frame received from the AP MLD on the first link of the multiple links, the management frame encoded to include an element comprising a link ID bitmap identifying two or more of the multiple links including the second link to which the element applies; and
encode for transmission one or more medium access control (MAC) service data unit (MSDUs) for transmission to the AP MLD over two or more of the multiple links,
wherein the STA MLD has a single medium access control (MAC) service access point (SAP) to logical link control (LLC), which includes one MAC data service interface, and
wherein the processing circuitry is configured to encode the MSDUs for transmission to the one MAC data service interface of the AP MLD from one MAC data service interface of the STA MLD across the multiple links,
wherein the element of the management frame is one of a target wake-up time (TWT) element and a Multi-Link Link Information element,
wherein when the element of the management frame is the TWT element, the link ID bitmap identifies two or more of the multiple links including the second link to which the TWT element applies, and
wherein when the element of the management frame is the Multi-Link Link Information element, the link ID bitmap identifies two or more of the multiple links including the second link to which the Multi-Link Link Information element applies.

* * * * *